(12) United States Patent
Gilra et al.

(10) Patent No.: US 10,776,907 B2
(45) Date of Patent: Sep. 15, 2020

(54) DYNAMIC IMAGE RESOLUTION ADJUSTMENT FOR RENDERING CHANGES TO GRAPHICAL CONTENT

(71) Applicant: Adobe Inc., San Jose, CA (US)

(72) Inventors: Anant Gilra, San Jose, CA (US); Steven Brooks, Cupertino, CA (US)

(73) Assignee: Adobe Inc., San Jose, CA (US)

(*) Notice: Subject to any disclaimer, the term of this patent is extended or adjusted under 35 U.S.C. 154(b) by 141 days.

(21) Appl. No.: 16/169,712

(22) Filed: Oct. 24, 2018

(65) Prior Publication Data

US 2020/0134796 A1 Apr. 30, 2020

(51) Int. Cl.
*G06T 5/50* (2006.01)
*G06F 3/0484* (2013.01)

(52) U.S. Cl.
CPC ............ *G06T 5/50* (2013.01); *G06F 3/04845* (2013.01)

(58) Field of Classification Search
CPC .............................. G06T 5/50; G06F 3/04845
See application file for complete search history.

(56) References Cited

U.S. PATENT DOCUMENTS

| | | | | |
|---|---|---|---|---|
| 6,686,918 B1 * | 2/2004 | Cajolet | ................... | G06T 13/00 345/419 |
| 6,720,979 B1 * | 4/2004 | Shrader | ................... | G06T 13/80 345/473 |
| 8,364,648 B1 * | 1/2013 | Sim-Tang | ................ | G06F 16/20 707/674 |
| 2002/0030699 A1 * | 3/2002 | Van Ee | .................. | G06F 3/0488 715/810 |
| 2007/0101072 A1 * | 5/2007 | Jackson | .............. | G06F 13/4239 711/154 |
| 2013/0293550 A1 * | 11/2013 | Cardno | .................... | G06T 13/80 345/428 |
| 2016/0110063 A1 * | 4/2016 | Connolly | ........... | G06Q 30/0277 715/716 |
| 2016/0147721 A1 * | 5/2016 | Gilra | ..................... | G06F 40/166 715/229 |
| 2018/0365813 A1 * | 12/2018 | Leong | ....................... | G06T 5/50 |

* cited by examiner

*Primary Examiner* — Ming Y Hon
(74) *Attorney, Agent, or Firm* — Kilpatrick Townsend & Stockton LLP (57) ABSTRACT

In some embodiments, an image manipulation application receives, via a user interface, an input to manipulate an image displayed at a target resolution. The image manipulation application determines a normalized number of tracker events between two consecutive renditions of the image caused by manipulating the image based on the input. Based on the normalized number of tracker events, the image manipulation application selects a version of the image from a set of versions of the image that have different resolutions of the image including the target resolution. The selected version of the image has a lower resolution than the target resolution. The image manipulation application manipulates the selected version of the image based on the input and generates an updated image for display in the user interface in the next rendition of the image.

20 Claims, 7 Drawing Sheets

DYNAMIC IMAGE RESOLUTION ADJUSTMENT FOR RENDERING CHANGES TO GRAPHICAL CONTENT

TECHNICAL FIELD

This disclosure relates generally to computer-implemented methods and systems for computer graphics processing. Specifically, the present disclosure involves dynamic image resolution adjustment for rendering changes to image content.

BACKGROUND

Some image manipulation applications provide functions that allow a user to manipulate an image displayed in a user interface, such as moving, rotating, blurring, or changing the zoom level of the image. An animation of the manipulation can be presented in the user interface to illustrate the process of the manipulation. For instance, if an image manipulation application receives a user input dragging the image along a path to a new position using a mouse, the image manipulation application displays a movement of the image concurrently with the dragging input by rendering the image at various points along the path in the user interface.

However, in some cases, the image manipulation application renders the image at the different points more slowly than the dragging input moves along the path. For instance, if a dragging input moves from a start point to an end point, a rendition of the image at the end point may occur a few second after the dragging input reaches the end point, resulting in a noticeable lag between the dragging input and corresponding image rendition. This problem can be caused by, for example, insufficient computing resources on the computing device executing the image manipulation application, the large file size of the image, the high resolution of the image, the large number of layers in the images, the high complexity of the image operations, and so on.

Existing techniques address this issue by skipping events of the input device and discarding all input device events between two image renditions. As a result, images are rendered selectively in the animation, and discontinuity can be observed in the rendered animation. For instance, if a dragging input passes through at least three points of a path, the image manipulation application may only render the image at the first and third points, causing the image to "jump" between the first and third points rather than being rendering smoothly along the path. Other solutions use a copy of the image at a specific resolution lower than the original resolution of the image during the animation rendering. Although this type of solutions is able to reduce the lag between the rendered image and the position of the input device, the rendered images during the animation are fixed at the specific low resolution even if the computing device is capable of rendering a higher resolution image for certain renditions, resulting in a poor visual quality of the rendered images.

SUMMARY

Certain embodiments involve dynamically adjusting image resolution for animating or otherwise rendering changes to image content within an image manipulation. In one example, an image manipulation application receives, through a user interface, an input to manipulate an image. The image is displayed at a target resolution that is suitable for the current settings of the user interface. The image manipulation application manipulates the image based on the input and generates multiple renditions of the image to show an animation of the image manipulation. To determine the resolution of the image for the next rendition, the image manipulation application determines a normalized number of tracker events between two consecutive renditions of the image. Based on the determined normalized number of tracker events, the image manipulation application selects a version of the image from a set of versions of the image that have different resolutions of the image including the target resolution. In one example, the selected version of the image has a lower resolution than the target resolution. The image manipulation application manipulates the selected version of the image based on the input and generates an updated image for display in the user interface in the next rendition of the image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The present disclosure involves dynamically adjusting image resolution for animating or otherwise rendering changes to image content within an image manipulation. As discussed above, existing image manipulation methods often animate edits to image content with insufficient visual quality, where noticeable lags may occur between the movement of a user input and a rendering of the corresponding image manipulation. Certain embodiments described herein address these limitations by dynamically adjusting the resolution of the image from rendition to rendition based on an input for manipulating the image. For instance, an image manipulation application could increase or decrease the resolution of the image being manipulated for a next rendition based on previous renditions and activities of the input device occurred between two consecutive renditions. If a large number of input activities have occurred between the last two renditions, the image manipulation application will reduce the resolution of the image to speed up the rendering process so that a sufficient number of rendered images can be generated to reflect the input activities. Conversely, if a small number of input activities have occurred between the last two renditions, the image manipulation application will determine that current renditions are sufficient for providing the animation. The image manipulation application can increase the resolution of the image for the next rendition to provide a high visual quality of the rendered image. As a result, the image manipulation application can provide a smooth animation of the manipulation without unnecessarily sacrificing the visual quality of the rendered images.

The following non-limiting example is provided to introduce certain embodiments. In this example, an image manipulation application is used to manipulate an image according to an input and to generate a series of images based on the input to provide an animation of the manipulation. The image manipulation application receives an input from an input device indicating a request to manipulate an image displayed in a user interface at a target resolution. As used herein, the term "target resolution" of an image refers to a lowest resolution at which the image can be displayed at current settings without introducing visual artifacts, such as pixelations. The image manipulation application manipulates the image and generates various rendered images based on changes in the input. For instance, if the input is a dragging motion along an arc path, which could indicate a rotation operation to be applied the image, the image manipulation application will render and display an image rotated by a corresponding number of degrees as the input moves along the arc path.

The image manipulation application monitors the activities of the input device between two consecutive renditions of the image. In some embodiments, the activities of the input device is measured based on the number of tracker events generated by the input device. As used herein, the term "tracker event" refers to an event notifying that movement or other changes of an input device have been detected. For instance, a mouse moving from one location to another location involves multiple small movements of the mouse, and an image manipulation application will therefore generate multiple tracker events corresponding to these small movements. The number of the tracker events is an indication of the number of rendered images to be generated. A higher number of tracker events can indicate a constantly changing input, which could require renditions of an image to keep the animation of the corresponding image manipulation smooth and continuous. On the other hand, a lower number of the tracker events can mean that the input changes slowly and thus fewer image renditions would be sufficient to provide a smooth animation.

Continuing with this example, a high number of tracker events between two consecutive renditions of the image can indicate that the current renditions of the image are insufficient to prevent lags or discontinuities when animating an image manipulation application corresponding to a user input. To increase the performance of a rendering process, the image manipulation application selects a version of the image with a lower resolution for rendering. The image manipulation application selects the image version from an image pyramid containing multiple versions of the image at different resolutions, where the selected image version has a lower resolution than a current version used for rendering operations (e.g., a version that has been selected when the user input begins). In the next rendition of the image, the image manipulation application manipulates the selected image to generate a rendered image for display.

The image manipulation application continues to monitor the number of tracker events between two consecutive renditions of the image. If the number of tracker events between two consecutive renditions of the image is still high, the image manipulation application accesses the image pyramid and selects a version of the image having a lower resolution than the current version of the image. Conversely, if the number of tracker events between two consecutive renditions of the image is low, the image manipulation application selects a version of the image having a resolution higher than the current version of the image to provide a higher visual quality of the rendered image. The above process continues as the manipulation of the image is performed. The image manipulation application can return to a target resolution for rendering the image if the manipulation is complete (e.g., upon the release of a mouse button used for a dragging input).

As described herein, certain embodiments provide improvements in image processing by dynamically adjusting the resolution of an image rendered for animation of image manipulation. The dynamic resolution adjustment improves the visual quality of the animation by providing a smooth animation of the manipulation without unnecessarily reducing the resolution of rendered images. The dynamic nature of the resolution adjustment eliminates the need of operating on a high resolution image throughout the animation process. Thus, embodiments described herein improve the image manipulation by reducing the consumption of computing resources, such as CPU times and memory spaces.

As used herein, the term "image" refers to a photo, a picture, a digital painting, a computer-generated graphic, or any other artifact that depicts visual perception. As used herein, "rendering an image" or "manipulating an image" refers to the process of performing operations on an image based on one or more commands and generating an output image for display. For example, rendering or manipulating an image based on a rotation command includes rotating the layers of the image affected by the rotation if the image is represented by multiple layers, rotating titles of the image if the image containing multiple titles, or some combination thereof. The rendering or manipulating further includes compositing the multiple layers or tiles of the image into a single output image for display. The performance of the rendering or manipulating process is referred to herein as "image rendition" or "rendition." The output image generated by the rendering or manipulating process is referred to herein as the "rendered image."

Figure 1:
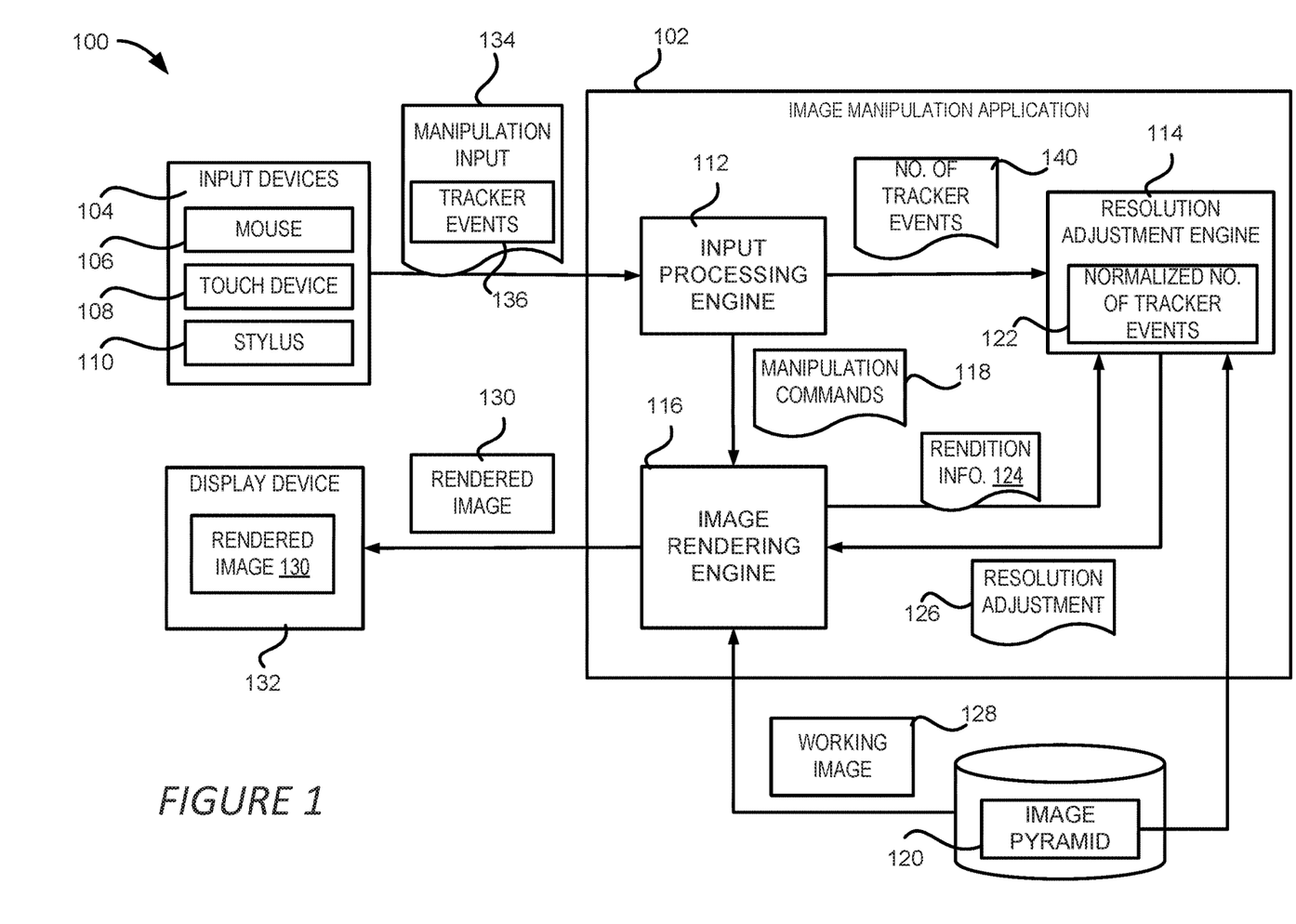
FIG. 1 depicts an example of a computing environment for using dynamic image resolution adjustment for rendering changes to image content in an image manipulation application, according to certain embodiments of the present disclosure.

Example Operating Environment for Image Manipulation with Dynamic Resolution Adjustment Referring now to the drawings, FIG. 1 depicts an example of a computing environment 100 for using an image manipulation application 102 to perform image manipulation based on an manipulation input 134. The computing environment 100 includes one or more processing devices that execute an image manipulation application 102, an input device 104 for providing commands to the image manipulation application 102, and a display device 132 for displaying a user interface for receiving commands from the input device 104 and for displaying a rendered image 130 generated by the image manipulation application 102 based on the commands.

The image manipulation application 102 includes an input processing engine 112 for receiving or detecting the manipulation input 134 generated by the input device 104 and an image rendering engine 116 for generating rendered images based on the manipulation input 134 and for providing each rendered image 130 to the display device 132 for display. The image manipulation application 102 further includes a resolution adjustment engine 114 for adjusting the resolution of the image being processed by the image rendering engine 116 so that a smooth and high visual quality animation of the manipulation can be generated.

The input processing engine 112 detects the manipulation input 134 from an input device 104 that is operated by a user by detecting tracker events 136 generated by the input device 104. Examples of an input device 104 include a touch device 108, such as a touchscreen or a touchpad, a mouse 106, a stylus 110, etc. Examples of tracker events include mouse clicks, dragging inputs, taps, pinches, spreads, rotates, swipe, applying pressure with the stylus, changing angle of the stylus, etc.

The input processing engine 112 interprets the detected manipulation input 134 and generates manipulation commands 118 so that the image rendering engine 116 can manipulate the image according to the manipulation input 134. In one example, the input processing engine 112 interprets the manipulation input 134 based on the type of the tracker events 136 contained in the manipulation input 134. For example, if the tracker events 136 include a dragging event of the mouse 106 that drags an image displayed in a user interface from one position to another position, the input processing engine 112 will interpret that the manipulation input 134 indicates a shifting operation on the image and the shifting parameters would be the difference of the original position of the image and the new position indicated by the position of the mouse 106. The input processing engine 112 generates the manipulation commands 118 based on this interpretation and sends the commands to the image rendering engine 116 for execution. In another example, if the tracker events 136 include pressure application of the stylus 110 on an image displayed in the user interface, the input processing engine 112 will interpret that the manipulation input 134 indicates a blurring operation on the image and the degree of blurring is determined by the amount of the pressure applied by the stylus 110. The input processing engine 112 generates the manipulation commands 118 for blurring for the image rendering engine 116.

In some cases, the manipulation input 134 is generated by an input device 104 based on a single action of the user, such as a mouse click. In those cases, the tracker events 136 can include a small number of tracker events. In the example of a mouse click, the tracker events 136 include a mouse down event indicating the mouse is pressed down, and a mouse up event indicating the mouse is released. In other cases, however, the manipulation input 134 is generated by an input device 104 through a series of actions of the user, such as a mouse dragging, a continuous pressure application of a stylus 110, a pinch or spread using two fingers on the touch device 108, etc. The tracker events 136 for this type of manipulation input 134 would include multiple events, such as a mouse down event, multiple mouse moves event and a mouse up event, or a stylus down event, multiple stylus pressure change events, and a stylus up event. If the manipulation input 134 involves a series of actions, the input processing engine 112 will interpret the manipulation input 134 as new tracker events 136 are generated by the input device 104 until the series of actions are complete, such as the mouse is released or the stylus is lifted. The input processing engine 112 can send a message to the image rendering engine 116 indicating the completion of the manipulation.

The image rendering engine 116 receives the manipulation commands 118 from the input processing engine 112 and performs the manipulation on the rendered image 130 accordingly. In order to provide an animation of the image manipulation process, the image rendering engine 116 generates multiple rendered images for the manipulation process that correspond to the series of actions indicated in the manipulation input 134. Detailed examples of generating multiple rendered images for a manipulation process are described herein with respect to FIGS. 3 and 7.

To perform dynamic resolution adjustment, the resolution adjustment engine 114 obtains rendition information 124 from the image rendering engine 116. The rendition information 124 includes information associated with each rendition of the image, such as a time stamp associated with the rendition, the resolution of the image used in the rendition, and so on. In addition, the resolution adjustment engine 114 obtains the number of tracker events 140 between two consecutive renditions of the image from the input processing engine 112.

As discussed above, the number of tracker events 140 between two consecutive renditions of the image can be utilized as an indication for the activeness of the manipulation input 134. For the same type of input device 104, a higher number of tracker events 140 between two consecutive renditions of the image can mean that more actions are involved in the manipulation input 134 and the current frequency of image renditions might not be enough to provide a smooth animation for the manipulation. As such, the resolution adjustment engine 114 determines a version of the image with a lower resolution than the current version of the image is to be used so that the speed of the rendition can be increased and more rendered images can be generated to reflect the actions in the manipulation input 134. If the number of tracker events 140 between two consecutive renditions of the image is low, then the resolution adjustment engine 114 can determine that the current frequency of rendition is high and the resolution of the image can be increased to improve the visual quality of the rendered image.

In some embodiments, the resolution adjustment engine 114 determines whether the number of tracker events is high or low by comparing the number of tracker events with threshold numbers of tracker events. In addition, the number of tracker events 140 obtained from the input processing engine 112 might contain noises caused by, for example, false detections of the tracker events 136. The resolution adjustment engine 114 can reduce the impact of these noises by converting the number of tracker events 140 in a logarithmic scale, and by calculating a normalized number of tracker events 122 to including the number of tracker events 140 between the current two consecutive renditions and past consecutive renditions of the image. The normalized number of tracker events 122 is used for comparison with the threshold numbers of tracker events to determine whether to adjust the resolution of the image. Detailed examples of calculating and comparing the normalized number of tracker events 122 with threshold numbers of tracker events are described herein with respect to FIGS. 4 and 6.

The decision of increasing or decreasing the resolution of the image is included in resolution adjustment 126 and sent to the image rendering engine 116. In some embodiments, the resolution adjustment engine 114 determines the resolution adjustment 126 by referencing to an image pyramid 120. The image pyramid 120 includes multiple versions of the image being manipulated, each version corresponding to a different resolution of the image. The multiple versions of the images are ordered according to their resolutions, for example, from the highest resolution to the lowest resolution with the highest resolution as level 1 and the lowest resolution as level N.

If the resolution adjustment engine 114 decides to lower the resolution of the image, the resolution adjustment engine 114 can instruct the image rendering engine 116, in the resolution adjustment 126, to move down in the image pyramid 120 to retrieve a version of the image having a lower resolution. Similarly, if the resolution adjustment engine 114 decides to increase the resolution of the image, the resolution adjustment engine 114 can instruct the image rendering engine 116 to move up in the image pyramid 120 to retrieve a version of the image having a higher resolution. In some embodiments, in order to prevent abrupt changes in the rendered image 130, each adjustment of the resolution of the image cannot be more than one level. Detailed examples of the image pyramid 120 are described herein with respect to FIG. 5.

Based on the resolution adjustment 126, the image rendering engine 116 accesses the image pyramid 120 and retrieves the version of the image in the corresponding level as an working image 128. The image rendering engine 116 performs the operations on the working image 128 according to the manipulation commands 118, thereby generating an updated rendered image 130 in the next image rendition. The image rendering engine 116 provides the updated rendered image 130 to the display device 132 for display. Additional details regarding the dynamic adjustment of image resolution are described herein with respect to FIGS. 2-7.

Examples of Computer-Implemented Operations for Dynamic Resolution Adjustment

Figure 2:
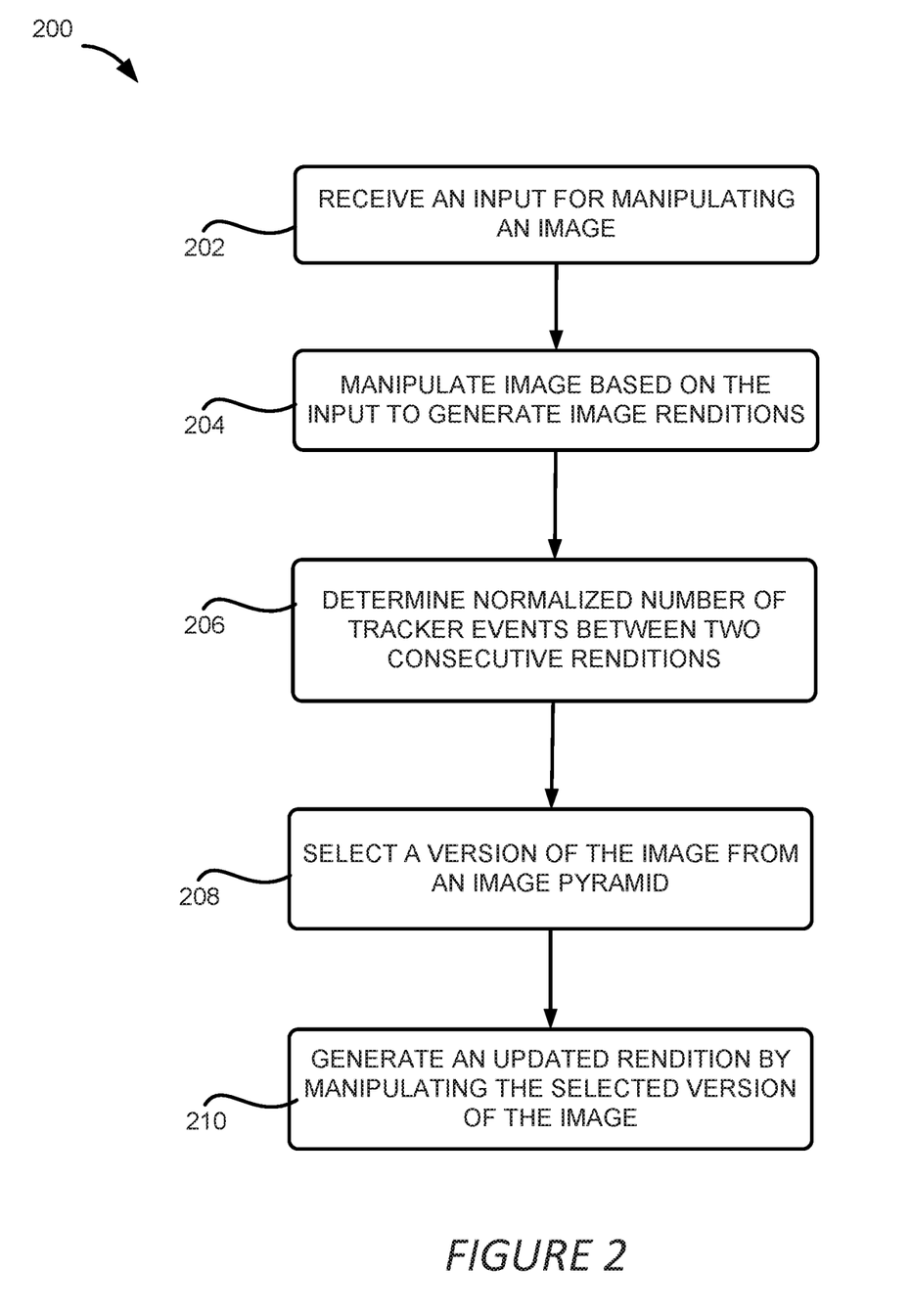
FIG. 2 depicts an example of a process for performing dynamic image resolution adjustment, according to certain embodiments of the present disclosure.

FIG. 2 depicts an example of a process 200 for performing dynamic image resolution adjustment, according to certain embodiments of the present disclosure. One or more computing devices (e.g., the computing environment 100) implement operations depicted in FIG. 2 by executing suitable program code (e.g., the image manipulation application 102). For illustrative purposes, the process 200 is described with reference to certain examples depicted in the figures. Other implementations, however, are possible.

At block 202, the process 200 involves receiving an input through a user interface presented by an image manipulation application 102 to manipulate an image displayed at a target resolution in the user interface. One or more computing devices execute program code from the image manipulation application 102 to implement block 202. For instance, the image manipulation application 102 monitors, detects, receives, or otherwise accesses the manipulation input 134 from one or more input devices 104. The input device 104 can include a mouse 106, a touch device 108, a stylus 110, or other devices. The manipulation input 134 includes one or more actions that are described by tracker events 136, such as mouse clicks, dragging inputs, taps, pinches, spreads, rotates, swipe, applying pressure with a stylus, changing angle of a stylus, etc. In some embodiments, an input processing engine 112 detects and interprets the tracker events 136 to generate manipulation commands 118 that include the type of the operations involved in the manipulation and the parameters for the operations.

At block 204, the process 200 involves manipulating the image based on the manipulation commands 118 generated according to the manipulation input 134. One or more computing devices execute program code from the image manipulation application 102 to implement block 204. For instance, an image rendering engine 116 of the image manipulation application 102 accesses the manipulation commands 118 and performs operations specified in the manipulation commands 118 on the image, such as rotation, shifting, scaling, blurring, and so on. The image rendering engine 116 generates multiple rendered images corresponding to multiple manipulation commands 118 received from the input processing engine 112. An animation of the manipulation process is provided by displaying the rendered images 130 on a display device 132 along the movement or other changes of the input device 104.

Figure 3:
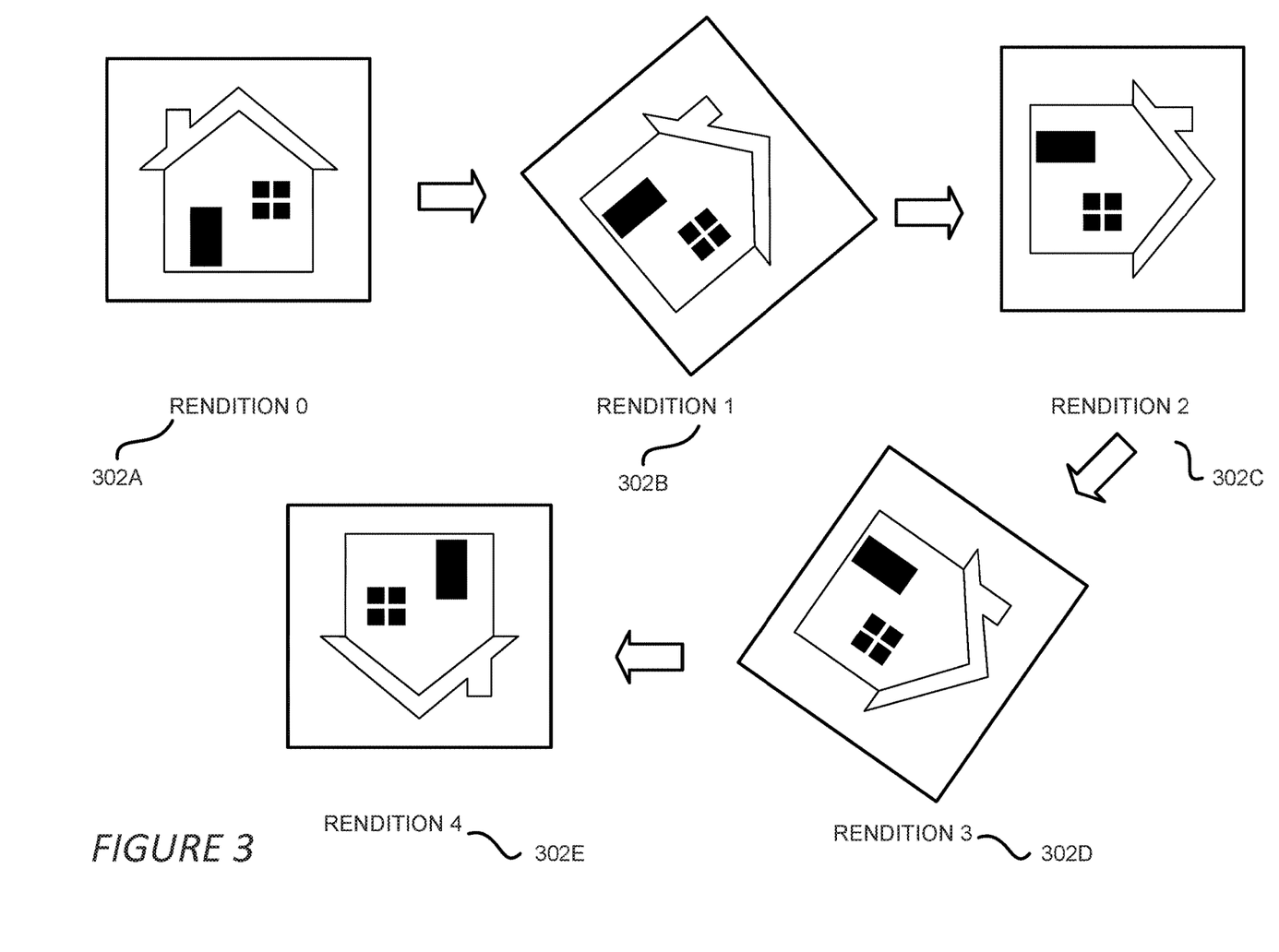
FIG. 3 depicts an example of an animation of a rotation manipulation on an image, according to certain embodiments of the present disclosure.

FIG. 3 depicts an example of an animation of a rotation manipulation on an image that includes multiple image renditions 302A-302E (which may be referred to herein individually as an image rendition 302 or collectively as the image renditions 302). The rotation manipulation might be based on a manipulation input 134 containing a mouse 106 moving along a half circle clockwise to indicate rotating the image by 180 degrees. At rendition 302A, the mouse is at its starting location and thus image is at its original state without any rotation. As the mouse starts to move, the image rendering engine 116 starts to generate image renditions 302. As shown in FIG. 3, the image rendering engine 116 generates an image rendition 302B rotated by 45 degrees corresponding to the mouse moving to a position between 1 o' clock and 2 o' clock, and an image rendition 302C rotated by 90 degrees corresponding to the mouse moving to the 3 o'clock position. Similarly, an image renditions 302D and an image renditions 302E are generated for the mouse moving to a position between 4 o' clock and 5 o' clock, and a position near 6 o' clock, respectively. The rendered image in each image rendition 302 is displayed on the display device 132 one by one as the mouse moves to provide an animation of the rotation manipulation of the image.

Referring back to FIG. 2, at block 206, the process 200 involves determining the normalized number of tracker events 122 between two consecutive renditions of the image. One or more computing devices execute program code from the image manipulation application 102 to implement block 206. In some cases, the resolution adjustment engine 114 receives the rendition information 124 from the image rendering engine 116 to determine the current two consecutive renditions of the image. The resolution adjustment engine 114 also obtains the number of tracker events 140 between two consecutive renditions of the image from the input processing engine 112.

Figure 4:
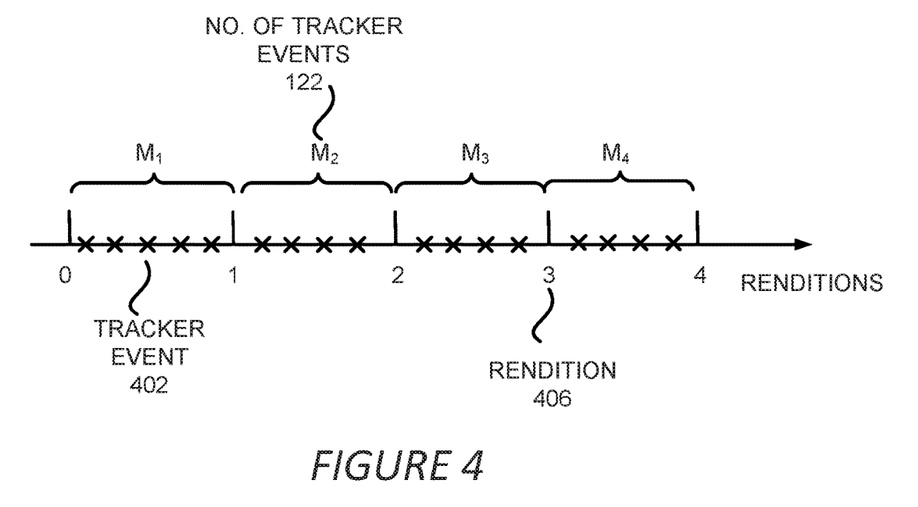
FIG. 4 depicts an example of image renditions and tracker events captured between consecutive image renditions, according to certain embodiments of the present disclosure.

FIG. 4 depicts an example of image renditions and tracker events captured between consecutive image renditions. As shown in FIG. 4, between two consecutive renditions 406 of the image, a number of tracker events 402 can occur and be captured by the input processing engine 112. The resolution adjustment engine 114 tracks each image rendition 406 based on the rendition information 124 and obtains the number of tracker events 140 between two consecutive renditions of the image from the input processing engine 112. In some embodiments, the resolution adjustment engine 114 calculates a normalized number of tracker events 122 by incorporating the number of tracker events 140 between past consecutive renditions of the image. Denoting the number of tracker events 140 between rendition i−1 and rendition i as $M_i$, and assuming the current rendition is rendition K, the normalized number of tracker events 122, denoted as $\tilde{M}_K$, can be calculated as $$\tilde{M}_K = \alpha \frac{1}{K-1} \sum_{i=1}^{K-1} M_i + (1-\alpha) M_K. \quad (1)$$

where α is a parameter indicating a weight distribution between the number of tracker events between the current two consecutive renditions and the number of tracker events between past consecutive renditions of the image. For example, the resolution adjustment engine 114 can assign a value of 0.7 to α to apply more weights to the past number of tracker events than the current number of tracker events. Alternatively, the resolution adjustment engine 114 can assign more weights to the current number of tracker events by choose a value less than 0.5 for α.

By incorporating the past number of tracker events, the resolution adjustment engine 114 can reduce the impact of the noises in the current number of tracker events, thereby providing more stable and reliable resolution adjustment. To further reduce the impact of the noises in the number of tracker events 140, especially, the spikes in the number of tracker events 140, the resolution adjustment engine 114 can calculate the normalized number of tracker events 122 on a logarithmic scale. In this case, Equation (1) becomes:

$$\tilde{M}_K = \alpha \frac{1}{K-1} \sum_{i=1}^{K-1} \log(M_i) + (1-\alpha) \log(M_K). \quad (2)$$

The logarithmic operator scales down the value of $M_i$. As a result, a spike in $M_i$ would not cause a large change in the calculated normalized number of tracker events $\tilde{M}_K$. The logarithmic operation can be performed with respect to any bases, such as 2, 10, or the natural base e.

Depending on the type of input device, the normalized number of tracker events can be adjusted to accurately reflect the activity of the input device. For example, a stylus 110 can generate much more tracker events than a mouse 106. One of the reasons is that in addition to the movement of the stylus, a pressure change or an angle change of the stylus can cause the generation of the tracker events 136. To reduce the impact of these additional tracker events, for a stylus input device, the number of tracker events 140 is reduced, instead of being increased, if a tracker event is received at the same point until the number of tracker events 140 becomes 0. This helps to reduce the number of tracker events, thus making it more likely for a higher resolution image to be selected. This is beneficial because if the stylus is stationary, it is more likely that the user wants to have a high resolution image to be displayed so that the manipulation of the image can be performed more precisely.

In another example, a user input might include several mouse inputs each including a mouse down event, several mouse drag events and a mouse up event. For example, a user uses a mouse to continuously adjusting the position of an image in a short period of time by moving the image to various different locations through several mouse-down-mouse-up cycles. In such a scenario, calculating the normalized number of tracker events 122 for a subsequent mouse down event can be adjusted to take into account the number of tracker events calculated in previous mouse down/mouse up cycle. For example, for a subsequent mouse down event, in the calculation of the normalized number of tracker events 122, an averaged number of tracker events from previous mouse-down/mouse-up cycles is used in the first term in Equation (2) instead of setting it to zero. Because the image, device, and zoom level remain the same for the current cycle and previous cycles, by taking into account the number of tracker events in previous cycles, the proper image resolution that is suitable for the current setting can be found faster.

Referring back to FIG. 2, at block 208, the process 200 involves selecting a version of the image for rendering based on the determined normalized number of tracker events 122. One or more computing devices execute program code from the image manipulation application 102 to implement block 208. In some embodiments, the resolution adjustment engine 114 selects the version of the image from an image pyramid 120. The image pyramid 120 includes multiple versions of the image being manipulated, each version corresponding to a different resolution of the image.

Figure 5:
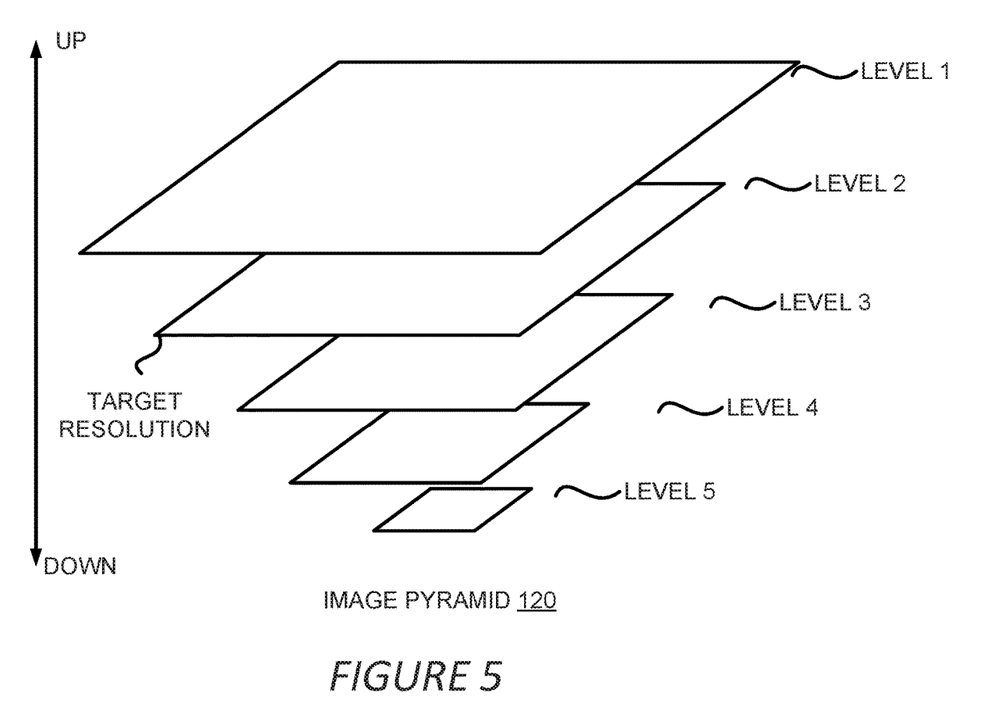
FIG. 5 depicts an example of a pyramid of images at various resolutions, in accordance with certain embodiments of the present disclosure.

FIG. 5 depicts an example of an image pyramid 120 that includes five versions of the image at five levels of resolution ordered from the highest to the lowest. In some embodiments, the resolution at level i is half of that of level i−1 in both dimensions of the image. For example, if an image at level i−1 has a resolution of $N_x \times N_y$, the resolution of the level i image has a resolution of $N_x/2 \times N_y/2$. In other words, the computational complexity of processing a level i image is one quarter of that of processing a level i−1 image. As a result, if the resolution adjustment engine 114 selects a version of the image from a level that is below the current level in the image pyramid 120, the rendering speed of the image can be significantly increased. Note that the target resolution of the image as discussed above is not necessarily the highest resolution of the image, although manipulation of the image, such as zooming in, may change the target resolution to be the highest resolution of the image.

Referring back to FIG. 2, in some implementations, the resolution adjustment engine 114 determines the version of the image to be selected by comparing the normalized number of tracker events 122 with two threshold numbers of tracker events: an upper threshold and a lower threshold. If the normalized number of tracker events is higher than the upper threshold number of tracker events, the resolution adjustment engine 114 determines that a version of the image with a lower resolution than the current version should be selected, i.e. moving down in the image pyramid 120. If the normalized number of tracker events is lower than the lower threshold number of tracker events, a version of the image having a higher resolution than the current version will be selected, i.e. moving up in the image pyramid 120. Otherwise, that is, the normalized number of tracker events is higher than the lower threshold and lower than the higher threshold, the resolution of the image remains unchanged.

In some embodiments, the resolution adjustment engine 114 also take into account other considerations in selecting the version of the image. For example, in order to prevent the visual quality of the rendered image 130 from significantly deviating from the target resolution, the resolution adjustment engine 114 sets a lowest resolution permitted for the image for rendering and the selected version of the image cannot have a resolution lower than that resolution. Further, the resolution adjustment engine 114 can limit the resolution adjustment in each rendition to a certain amount in order to prevent abrupt changes in the visual quality of the rendered image 130. Detailed examples of the selecting a version of the image for rendering are described herein with respect to FIG. 6.

At block 210, the process 200 involves generating a rendered image 130 by manipulating the selected version of the image. One or more computing devices execute program code from the image manipulation application 102 to implement block 210. For instance, the image rendering engine 116 can retrieve the selected version of the image from the image pyramid as the working image and apply the manipulation operations on the working image based on the manipulation commands 118 generated from the manipulation input 134. The image rendering engine 116 provides the rendered image 130 to the display device 132 for display.

Figure 6:
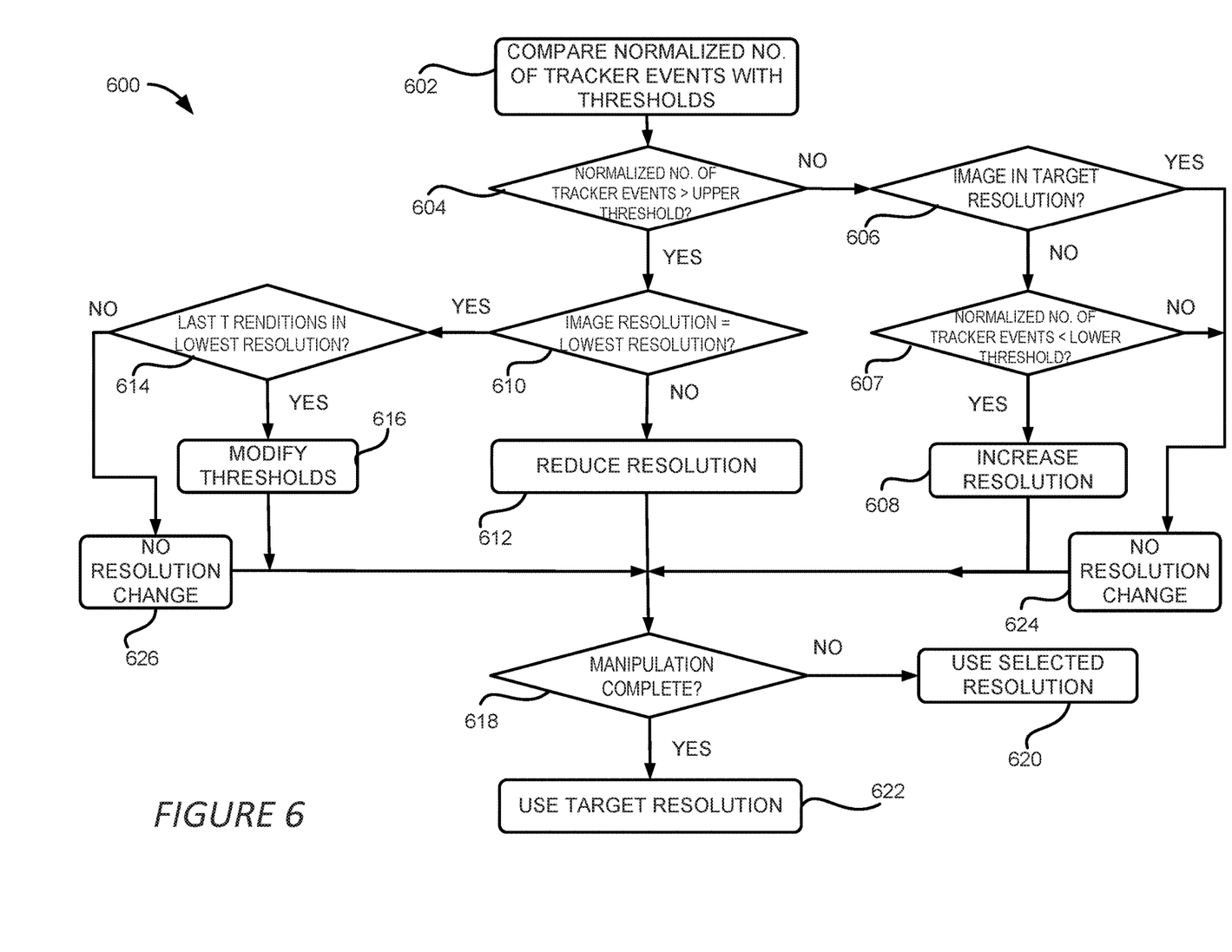
FIG. 6 depicts an example of a process for selecting a version of the image from an image pyramid, according to certain embodiments of the present disclosure.

FIG. 6 depicts an example of a process 600 for selecting a version of the image from an image pyramid 120. One or more computing devices (e.g., the computing environment 100) implement operations depicted in FIG. 6 by executing suitable program code (e.g., the image manipulation application 102). For illustrative purposes, the process 600 is described with reference to certain examples depicted in the figures. Other implementations, however, are possible.

At block 602, the process 600 involves comparing the normalized number of tracker events 122 calculated at block 206 of the process 200 with the upper and lower threshold numbers of tracker events. One or more computing devices execute program code from the image manipulation application 102 to implement block 602. For instance, the resolution adjustment engine 114 or other modules in the image manipulation application 102 determines the upper threshold and the lower threshold based on, for example, past experience of resolution adjustment, experiment results, or other factors. The resolution adjustment engine 114 also determines the value of the thresholds by considering how the normalized number of tracker events 122 is calculated at block 206 in process 200. For example, if the resolution adjustment engine 114 calculates the normalized number of tracker events 122 without using the logarithmic scale, then the thresholds are determined at a scale that match the normalized number of tracker events 122. If, at block 206, the resolution adjustment engine 114 determines the normalized number of tracker events 122 on a logarithmic scale, the thresholds should be also determined on the same logarithmic scale.

The resolution adjustment engine 114 further determines the values of the thresholds based on the type of the input device 104. For example, as discussed above, a stylus 110 can generate much more tracker events than a mouse 106. In a scenario where the manipulation is indicated only by the movement of the stylus, pressure changes and angle changes of the stylus can cause the number of tracker events 140 for the stylus to be much higher than that of a mouse if the mouse was used as an input device. Likewise, the tracker events 136 generated for a touch device 108 might also be different from the tracker events of a mouse or a stylus. The resolution adjustment engine 114 thus takes this into consideration in determining the values of the upper and lower thresholds.

At block 604, the resolution adjustment engine 114 determines whether the normalized number of tracker events 122 is greater than the upper threshold number of tracker events. If the normalized number of tracker events 122 is not greater than the upper threshold number of tracker events, the resolution adjustment engine 114 determines, at block 606, that whether the rendered image in the current rendition is at the target resolution. If the rendered image in the current rendition is at the target resolution, the resolution adjustment engine 114 determines, at block 624, that the resolution of the image remains the same. If the rendered image in the current rendition is not at the target resolution, the resolution adjustment engine 114 determines, at block 607, whether the normalized number of tracker events 122 is lower than the lower threshold. If the normalized number of tracker events 122 is not lower than the lower threshold, the resolution adjustment engine 114 determines, at block 624, that the resolution of the image remains unchanged. If it is determined at block 607 that the normalized number of tracker events 122 is lower than the lower threshold, the resolution adjustment engine 114 determines, at block 608, to increase the resolution of the image by selecting a version of the image with a higher resolution. For example, as discussed above, the resolution adjustment engine 114 can select the version of image by moving up in the image pyramid 120. In order to avoid abrupt change in visual quality of the rendered image, the resolution adjustment engine 114 can select a version of the image by moving up in the image pyramid 120 by one or two levels, i.e. selecting a version of the image that is one or two levels up from the current version of the image.

If, at block 604, the resolution adjustment engine 114 determines that the normalized number of tracker events 122 is greater than the upper threshold number of tracker events, the resolution adjustment engine 114 compares the current image resolution with a lowest resolution permitted for the image, at block 610. The lowest resolution is set so that the visual quality of the rendered image does not significantly deviate from the target resolution. For example, the resolution adjustment engine 114 may determine the lowest resolution to be a level that is three levels down from the target resolution. In the example shown in FIG. 5, the target resolution is at level 2, and the resolution adjustment engine 114 may determine that the lowest resolution is at level 5. In other words, no versions of the images below level 5 can be selected for rendering.

If, at block 610, the resolution adjustment engine 114 determines that the current resolution of the image has not reached the lowest resolution, the resolution adjustment engine 114 determines, at block 612, to decrease the resolution of the image by selecting a version of the image with a lower resolution. For example, the resolution adjustment engine 114 can select the version of image by moving down in the image pyramid 120 by one or two levels. If, at block 610, the resolution adjustment engine 114 determines that the current resolution of the image has reached the lowest resolution, the resolution adjustment engine 114 further determines, at block 614, whether the image in the last T consecutive renditions remain at the lowest resolution. The rendered image remaining at the lowest resolution for the past T renditions can indicate that the upper threshold number of tracker events is too low, resulting in the resolution of the image being maintained rather than being dynamically adjusted. To avoid this problem, resolution adjustment engine 114 can increase the value of the upper threshold at block 616. Here, T is a value that can be selected by the resolution adjustment engine 114 to determine when the threshold number of tracker events should be updated. If the rendered image does not remain at the lowest resolution for the past T renditions, the resolution adjustment engine 114 will determine, at block 626, that the current image still use the lowest resolution.

In one implementation, the lower threshold is adjusted in a manner similar to the upper threshold, that is, the lower threshold is increased by the same amount or by the same percentage if the upper threshold is increased. For example, the resolution adjustment engine 114 can determine if the image remains at the target resolution for the past several consecutive renditions. If so, the resolution adjustment engine 114 will determine that the lower threshold, as well as the upper threshold. The adjustment of the threshold can be made based on the resolution of the past several consecutive renditions as described above. It can also be made based on the percentage of the image remaining at the lower resolution or the target resolution. For example, if the image remains as the lowest resolution for 95% of the time, the upper and lower thresholds will be increased. Likewise, if the image remains at the target resolution for 95% of the time, the upper and lower thresholds will be decreased.

At block 618, the resolution adjustment engine 114 determines whether the manipulation has completed or not. The resolution adjustment engine 114 can determine the completion of the manipulation by receiving a message from the input processing engine 112 that an event indicating the end of the manipulation input 134 has been generated, such as a mouse up event, a finger lift event, or a stylus life event. If the manipulation has not completed, the resolution adjustment engine 114 selects the image with the resolution determined as described above. If the resolution adjustment engine 114 determines that the manipulation has completed, the resolution adjustment engine 114 selects, at block 622, the image with the target resolution.

Figure 7:
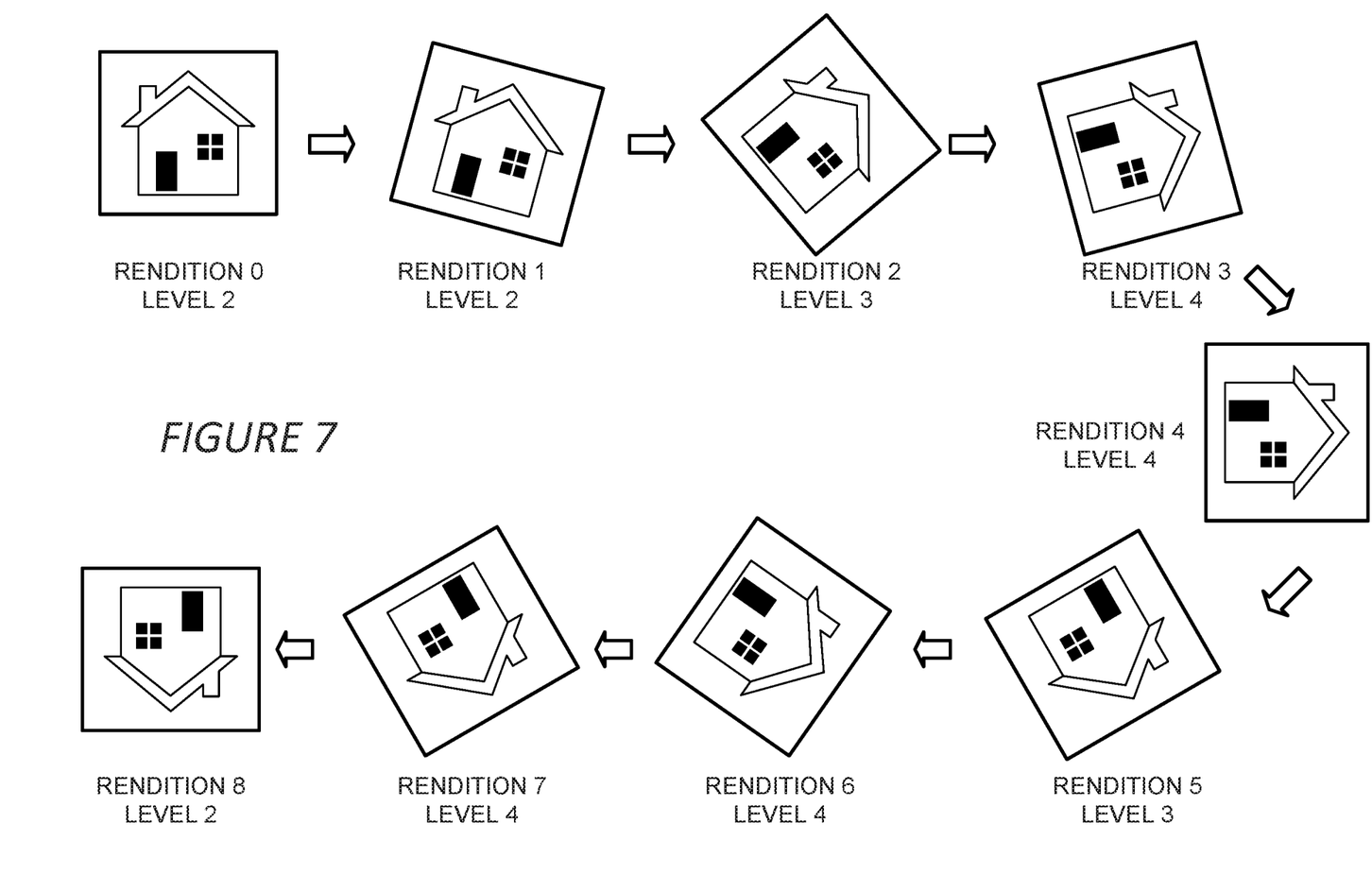
FIG. 7 depicts an example of an animation of a rotation manipulation with dynamic image resolution adjustment in accordance with certain embodiments of the present disclosure.

FIG. 7 depicts a simplified example of an animation of a rotation manipulation with dynamic image resolution adjustment. As shown in FIG. 7, multiple renditions are performed for the rotation manipulation at various rotation degrees thereby providing a smooth animation effect. Further, the rendered images at different renditions have different resolutions, indicated by the level number of the pyramid associated with the image. The resolution of the rendered image increases or decreases from rendition to rendition due to the dynamic nature of the resolution adjustment.

Computing System Example for Implementing Digital Overpainting

Figure 8:
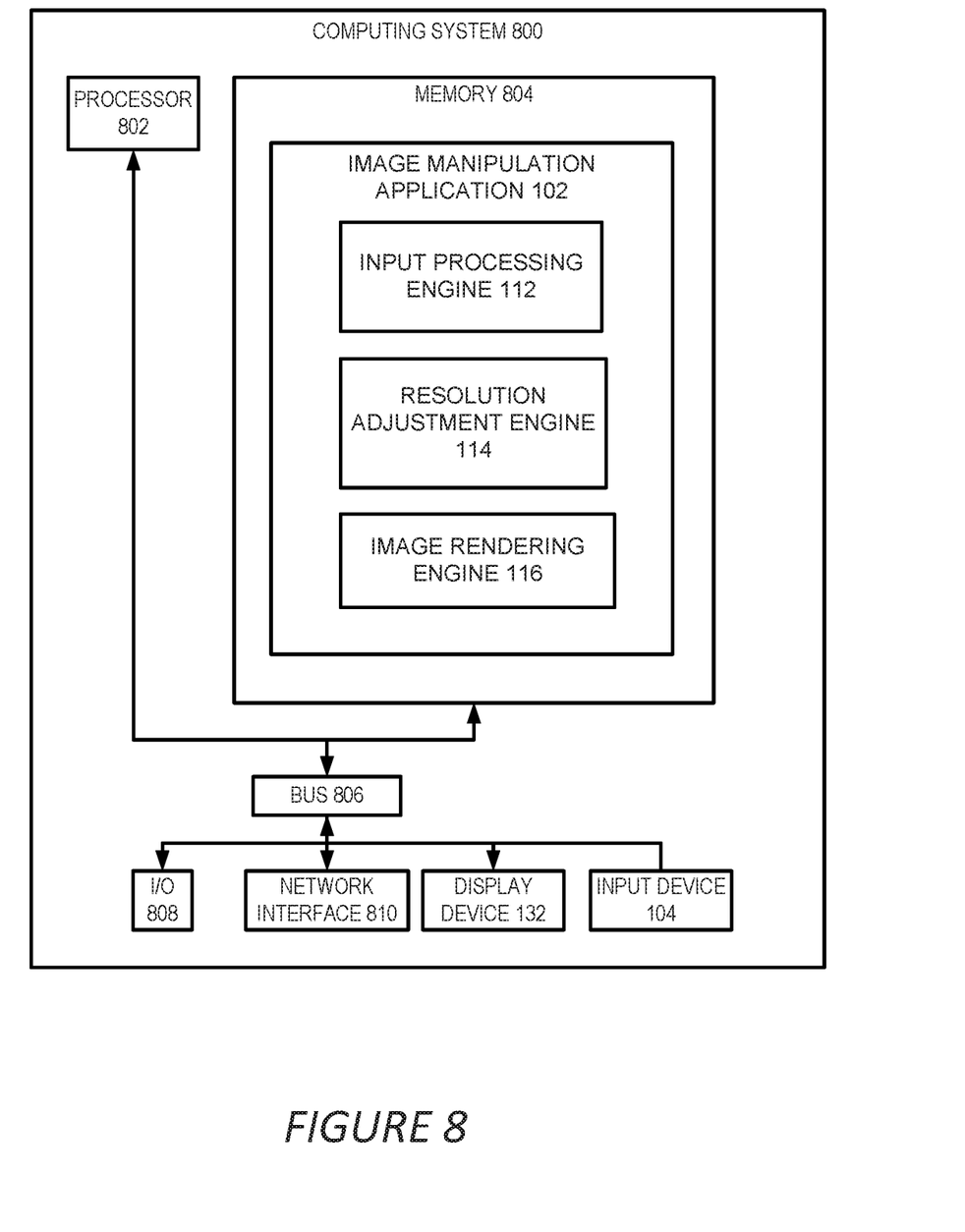
FIG. 8 depicts an example of a computing system that executes an image manipulation application for performing certain embodiments of the present disclosure.

Any suitable computing system or group of computing systems can be used for performing the operations described herein. For example, FIG. 8 depicts an example of a computing system 800 that can implement the computing environment of FIG. 1. In some embodiments, the computing system 800 includes a processing device 802 that executes the image manipulation application 102, a memory that stores various data computed or used by the image manipulation application 102, an input device 104 (e.g., a mouse, a stylus, a touchpad, a touchscreen, etc.), and a display device 132 that displays graphical content generated by the image manipulation application 102. For illustrative purposes, FIG. 8 depicts a single computing system on which the image manipulation application 102 is executed, the image pyramid 120 is stored, and the input device 104 and display device 132 are present. But these applications, datasets, and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 104, a display device 132, or other input or output devices. For example, the computing system 800 is shown with one or more input/output ("I/O") interfaces 808. An I/O interface 808 can receive input from input devices or provide output to output devices. One or more buses 806 are also included in the computing system 800. The buses 806 communicatively couples one or more components of a respective one of the computing system 800.

The computing system 800 executes program code that configures the processing device 802 to perform one or more of the operations described herein. The program code includes, for example, the image manipulation application 102 or other suitable applications that perform one or more operations described herein. The program code may be resident in the memory device 804 or any suitable computer-readable medium and may be executed by the processing device 802 or any other suitable processor. In some embodiments, all modules in the image manipulation application 102 (e.g., the input processing engine 112, the resolution adjustment engine 114, the image rendering engine 116, etc.) are stored in the memory device 804, as depicted in FIG. 8. In additional or alternative embodiments, one or more of these modules from the image manipulation application 102 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device that receives inputs for image manipulation application 102 or displays outputs of the image manipulation application 102) via a data network using the network interface device 810.

An input device 104 can include any device or group of devices suitable for receiving visual, auditory, or other suitable input that controls or affects the operations of the processing device 802. Non-limiting examples of the input device 104 include a touchscreen, stylus, a mouse, a keyboard, a microphone, a separate mobile computing device, etc. A display device 132 can include any device or group of devices suitable for providing visual, auditory, or other suitable sensory output. Non-limiting examples of the display device 132 include a touchscreen, a monitor, a separate mobile computing device, etc.

Although FIG. 8 depicts the input device 104 and the display device 132 as being local to the computing device that executes the image manipulation application 102, other implementations are possible. For instance, in some embodiments, one or more of the input device 104 and the display device 132 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which one or more processing devices perform operations comprising:
   receiving, via a user interface, an input to manipulate an image displayed at a target resolution;
   determining a normalized number of tracker events between two consecutive renditions of the image caused by manipulating the image based on the input;
   selecting, based on the normalized number of tracker events between the two consecutive renditions, a version of the image from a plurality of versions of the image, the plurality of versions having different resolutions of the image that include the target resolution, wherein the selected version of the image has a lower resolution than the target resolution; and
   generating an updated image for display in the user interface by manipulating the selected version of the image based on the input in a next rendition of the image.

2. The computer-implemented method of claim 1, wherein the version of the image is selected based on the normalized number of tracker events exceeding an upper threshold.

3. The computer-implemented method of claim 2, the operations further comprising:
   updating the normalized number of tracker events between two consecutive renditions of the image; and
   selecting a second version of the image from the plurality of versions based on the normalized number of tracker events being lower than a lower threshold, wherein the second version of the image has a higher resolution than the version of the image.

4. The computer-implemented method of claim 3, the operations further comprising selecting the upper threshold and the lower threshold based on a type of an input device that generates the input.

5. The computer-implemented method of claim 2, the operations further comprising:
   updating the normalized number of tracker events between two additional consecutive renditions of the image;
   determining that normalized number of tracker events is higher than the upper threshold;
   in response to determining that the normalized number of tracker events is higher than the upper threshold, determining that resolutions of the image in previous consecutive renditions remain at a lowest resolution permitted for the image; and
   in response to determining that resolutions of the image in previous consecutive renditions remain at the lowest resolution permitted for the image, increasing a value of the upper threshold.

6. The computer-implemented method of claim 1, wherein the normalized number of tracker events is determined based on a number of tracker events between current two consecutive renditions of the image and a number of tracker events between past two consecutive renditions of the image.

7. The computer-implemented method of claim 6, wherein determining the number of tracker events comprises calculating the number of tracker events on a logarithmic scale.

8. A system comprising:
a processing device; and
a non-transitory computer-readable medium communicatively coupled to the processing device, wherein the processing device is configured to execute program code stored in the non-transitory computer-readable medium and thereby perform operations comprising:
determining a normalized number of tracker events between two consecutive renditions of an image caused by an input to manipulate the image, the image being displayed at a target resolution;
selecting, based on the normalized number of tracker events between the two consecutive renditions, a version of the image from a plurality of versions of the image, the plurality of versions having different resolutions of the image that include the target resolution, wherein the selected version of the image has a lower resolution than the target resolution; and
generating an updated image for display by manipulating the selected version of the image based on the input in a next rendition of the image.

9. The system of claim 8, wherein the version of the image is selected based on the normalized number of tracker events exceeding an upper threshold.

10. The system of claim 9, wherein the operations further comprise:
updating the normalized number of tracker events between two consecutive renditions of the image; and
selecting a second version of the image from the plurality of versions based on the normalized number of tracker events being lower than a lower threshold, wherein the second version of the image has a higher resolution than the version of the image.

11. The system of claim 10, wherein the operations further comprise selecting the lower threshold and the upper threshold based on a type of an input device that generates the input.

12. The system of claim 8, wherein the normalized number of tracker events is determined based on a number of tracker events between current two consecutive renditions of the image and a number of tracker events between past two consecutive renditions of the image.

13. The system of claim 8, wherein the operations further comprise:
determining that manipulating the image is complete; and
in response to determining that manipulating the image is complete, generating a rendered image for display by performing a next rendition of the image at the target resolution.

14. A non-transitory computer-readable medium having program code that is stored thereon, the program code executable by one or more processing devices for performing operations comprising:
accessing a plurality of versions of an image, the versions having different resolutions of the image, wherein a first version of the image is being displayed in a user interface;
determining a normalized number of tracker events between two consecutive renditions of the image caused by an input to manipulate the image;
selecting, based on the normalized number of tracker events between the two consecutive renditions, a second version of the image from the plurality of versions of the image, wherein the second version of the image has a different resolution than the first version of the image; and
generating an updated image for display in the user interface by manipulating the second version of the image based on the input in a next rendition of the image.

15. The non-transitory computer-readable medium of claim 14, wherein the second version of the image is selected based on the normalized number of tracker events being lower than a lower threshold, wherein the second version of the image has a resolution higher than a resolution of the first version.

16. The non-transitory computer-readable medium of claim 15, wherein the operations further comprise:
updating the normalized number of tracker events between two additional consecutive renditions of the image;
determining that normalized number of tracker events is lower than the lower threshold;
in response to determining that the normalized number of tracker events is lower than the lower threshold, determining that resolutions of the image in previous consecutive renditions remain at a target resolution; and
in response to determining that resolutions of the image in previous consecutive renditions remain at the target resolution, decreasing a value of the lower threshold.

17. The non-transitory computer-readable medium of claim 14, wherein selecting the second version of the image comprises:
determining that the normalized number of tracker events is higher than an upper threshold;
in response to determining that the normalized number of tracker events is higher than the upper threshold, determining that a resolution of the first version of the image is higher than a lowest resolution permitted for the image; and
in response to determining that the resolution of the first version of the image is higher than the lowest resolution, selecting the second version from the plurality of versions of the image that has a resolution lower than the resolution of the first version.

18. The non-transitory computer-readable medium of claim 14, wherein the second version of the image is selected based on the normalized number of tracker events exceeding an upper threshold, wherein the second version has a resolution lower than a resolution of the first version.

19. The non-transitory computer-readable medium of claim 18, wherein the operations further comprise selecting the upper threshold based on a type of an input device that generates the input.

20. The non-transitory computer-readable medium of claim 14, wherein the operations further comprise:
determining that manipulating the image is complete; and
in response to determining that manipulating the image is complete, generating a rendered image for display by performing a next rendition of the image at a target resolution.

* * * * *